United States Patent
Cheng

(10) Patent No.: US 6,553,937 B1
(45) Date of Patent: Apr. 29, 2003

(54) WATER SHUT-OFF STRUCTURE OF A DRINKING DEVICE FOR A PET

(76) Inventor: Chen Hui Cheng, No. 172, Lun-Mei Rd., Chang Hua City, Chang Hua Hsien (TW)

( * ) Notice: Subject to any disclaimer, the term of this patent is extended or adjusted under 35 U.S.C. 154(b) by 0 days.

(21) Appl. No.: 10/096,228

(22) Filed: Mar. 12, 2002

(51) Int. Cl.⁷ .................................................. A01K 7/00
(52) U.S. Cl. ...................................... 119/72.5; 119/477
(58) Field of Search ................................ 119/72.5, 464, 119/477, 72, 51.03; 137/247.21; 251/339; 239/569, 570, 572; 222/501

(56) References Cited

U.S. PATENT DOCUMENTS

| | | | | |
|---|---|---|---|---|
| 2,014,652 A | * | 9/1935 | Jones | 222/446 |
| 3,771,496 A | * | 11/1973 | Atchley | 119/72.5 |
| 3,838,664 A | * | 10/1974 | Atchley | 119/72.5 |
| 4,589,373 A | * | 5/1986 | Hostetler et al. | 119/72.5 |
| 5,287,994 A | * | 2/1994 | Dempsey | 222/158 |
| 5,363,802 A | * | 11/1994 | Huff | 119/475 |
| 5,816,194 A | * | 10/1998 | Huff | 119/72.5 |

FOREIGN PATENT DOCUMENTS

GB     2329953 A   *  4/1999  ............. F16K/1/14

* cited by examiner

*Primary Examiner*—Charles T. Jordan
*Assistant Examiner*—John W. Zerr
(74) *Attorney, Agent, or Firm*—Harrison & Egbert

(57) ABSTRACT

A water shut-off structure of the drinking device for a pet is formed of a water outlet, a spout tube, a washer, and a steel ball. The water outlet is fastened at the inner end to a water container of the drinking device. The spout tube is fastened at the inner end to the outer end of the water outlet and is provided at the outer end with a discharge port. The spout tube is provided in the inner wall of the outer end with a stop ring. The washer is conical in form and is disposed in the spout tube such that the washer is confined by the outer end of the water outlet and the stop ring of the spout tube. The steel ball is movably received in the conical washer to allow or prevent the passage of water.

1 Claim, 5 Drawing Sheets

WATER SHUT-OFF STRUCTURE OF A DRINKING DEVICE FOR A PET

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a drinking device for a pet, and more particularly to a water shut-off structure of the drinking device for a pet.

BACKGROUND OF THE INVENTION

As shown in FIGS. 1–3, a prior art drinking device is designed for use by a pet and is formed of a water container 10 and a water outlet 11 located at the bottom of the container 10. The water outlet 11 is provided with a water shut-off structure comprising a spout tube 12, a washer 14, and a steel ball 15. The washer 14 and the steel ball 15 are received in the spout tube 12 such that the washer 14 and the steel ball 15 are located in proximity of a discharge port 13 of the spout tube 12, as shown in FIG. 2. Located between the inner wall of the spout tube 12 and the washer 14 is a projected portion 16, as illustrated in FIG. 3. When the steel ball 15 is joined with the washer 14, the flow of water in the water outlet 11 is shut off. As the steel ball 15 is moved away from the washer 14 by the tongue of a pet, the water is let out via the discharge port 13 of the spout tube 12. As soon as the pet has withdrawn its tongue from the steel ball 15, the steel ball 15 falls back to join with the washer 14 to prevent the passage of water through the discharge port 13.

Such a prior art water shut-off structure as described above is defective in design because the steel ball 15 tends to move sideways at the time when the steel ball 15 is licked by the tongue of a pet, thereby resulting in an incomplete reunion of the steel ball 15 with the washer 14. As a result, the water flow is not completely shut off at the discharge port 13. In addition, the projection 16 of the inner wall of the spout tube 12 hinders the immediate reunion of the steel ball 15 with the washer 14. Furthermore, the washer 14 is apt to be displaced by the act of licking.

BRIEF SUMMARY OF THE INVENTION

The primary objective of the present invention is to provide a pet drinking device with a water shut-off structure which is free of the shortcomings of the prior art structure described above.

In keeping with the principle of the present invention, the foregoing objective of the present invention is attained by a water shut-off structure comprising a water outlet, a spout tube, a steel ball, and a washer. The spout tube is fastened with the water outlet of a water container. The spout tube is provided in the inner wall of a discharge port thereof with a stop ring. The steel ball and the washer are disposed in the spout tube such that the steel ball and the washer are located between the stop ring of the inner wall of the spout tube and the outer end of the water outlet of the water container. The washer is securely located between the stop ring of the spout tube and the outer end of the water outlet. The washer is of a cone-shaped construction. The steel ball is received in the cone-shaped washer such that the steel ball can easily fall back into place to make an intimate contact with the inner wall of the cone-shaped washer as soon as the act of licking the steel ball by a pet is interrupted.

The features and advantages of the present invention will be more readily understood upon a thoughtful deliberation of the following detailed description of a preferred embodiment of the present invention with reference to the accompanying drawings.

DETAILED DESCRIPTION OF THE INVENTION

Figure 1:
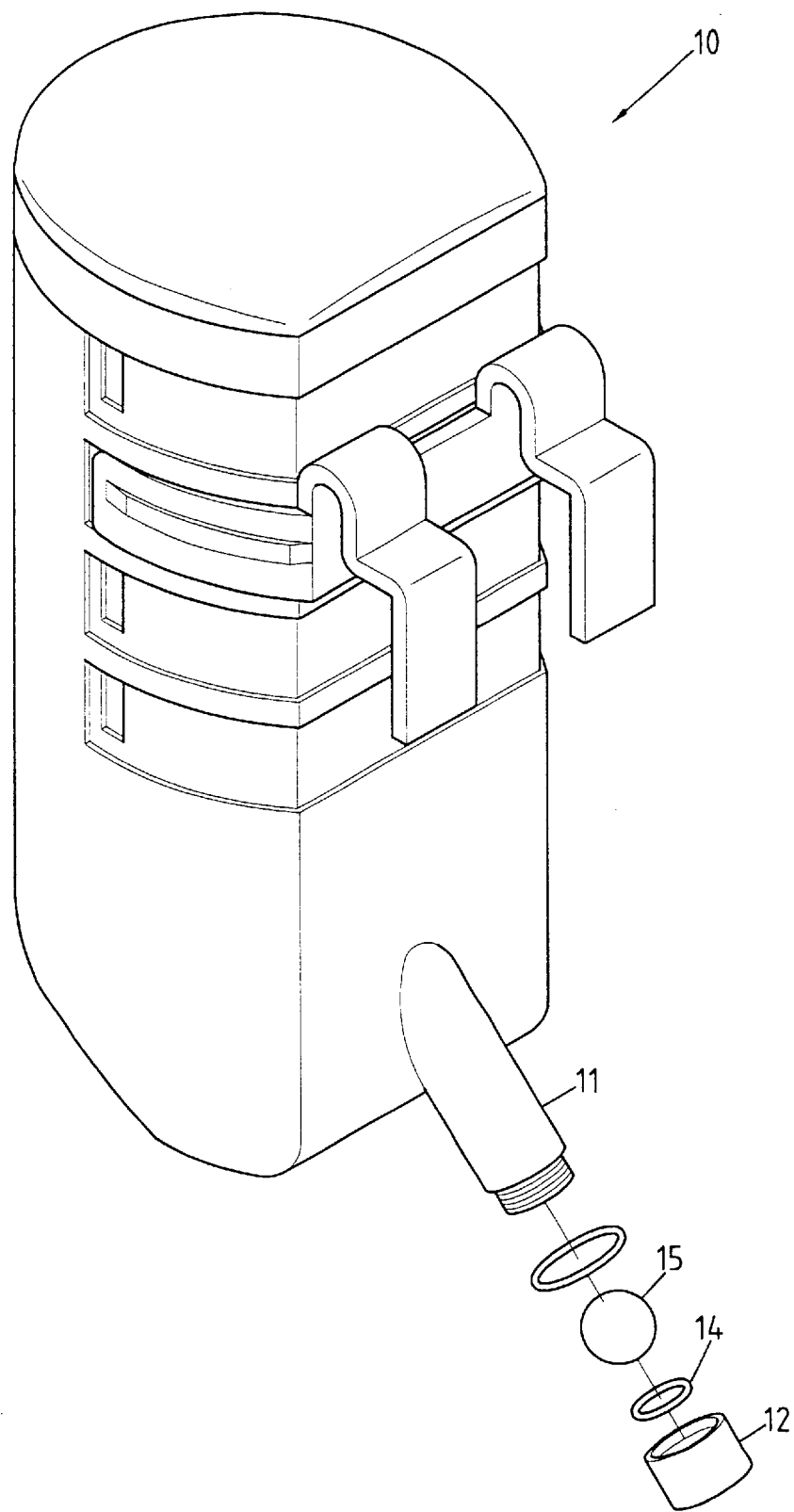
FIG. 1 shows an exploded perspective view of a prior art water shut-off structure of a drinking device for a pet.
Figure 2:
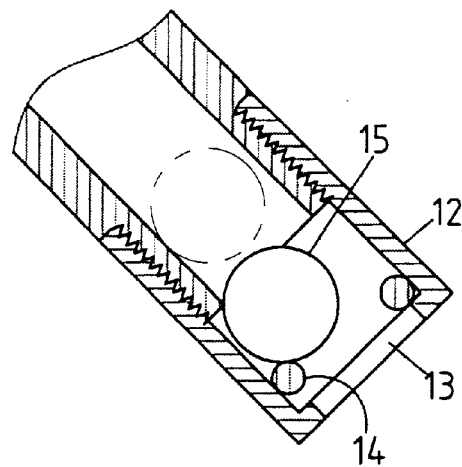
FIG. 2 is a sectional schematic view to show that a washer of the prior art water shut-off structure is displaced.
Figure 3:
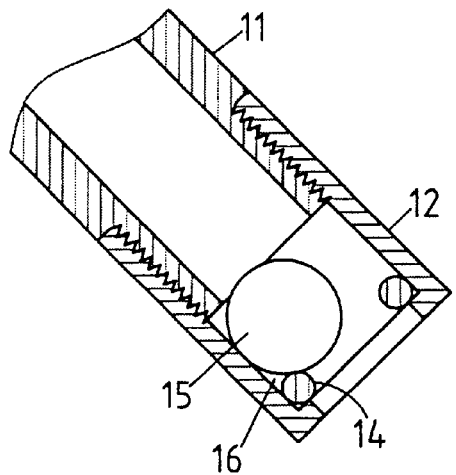
FIG. 3 is a sectional schematic view to show that a steel ball of the prior art water shut-off structure is so obstructed as to unable to fall back into place to shut off the water flow in conjunction with the washer.
Figure 4:
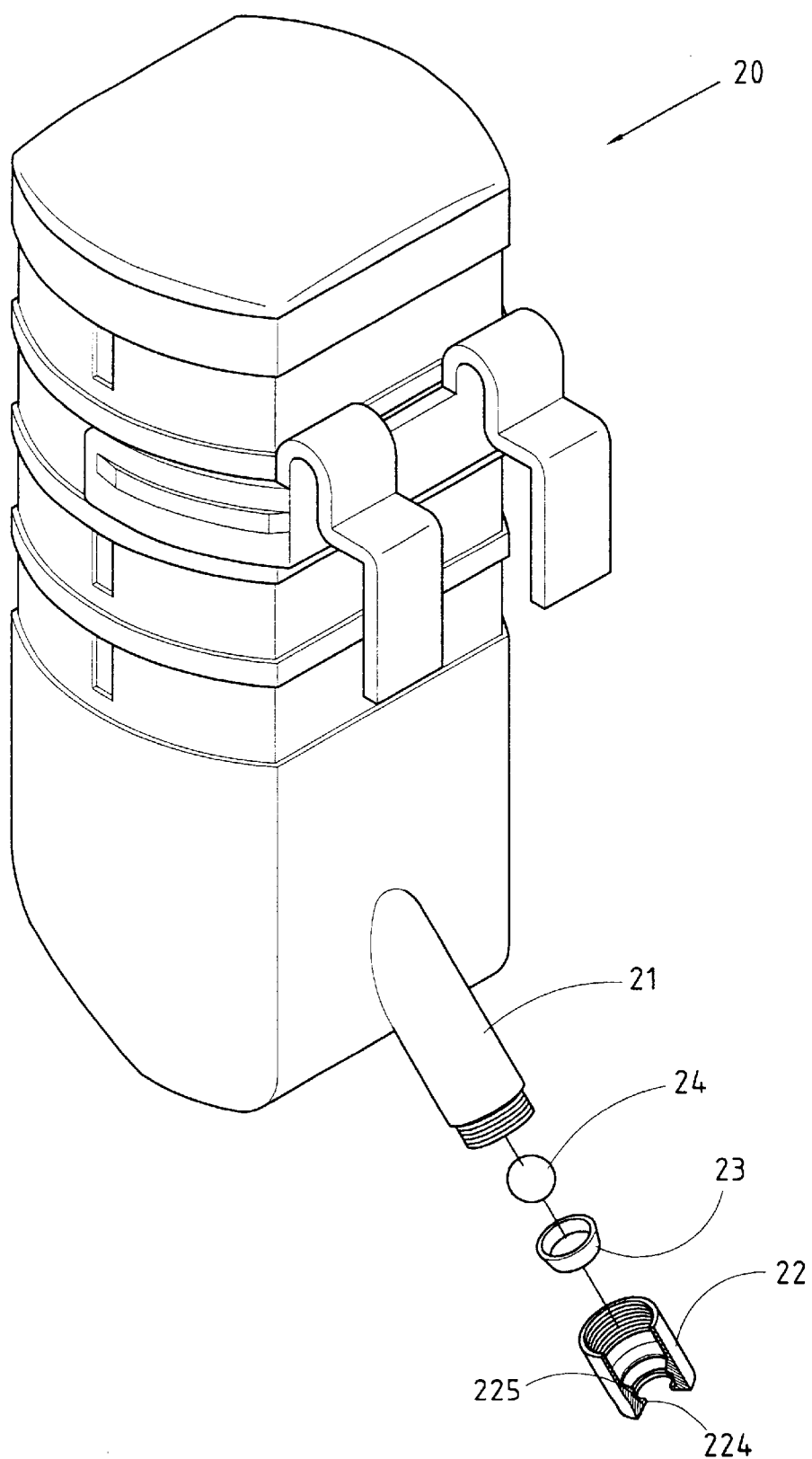
FIG. 4 shows an exploded view of the preferred embodiment of the present invention.
Figure 5:
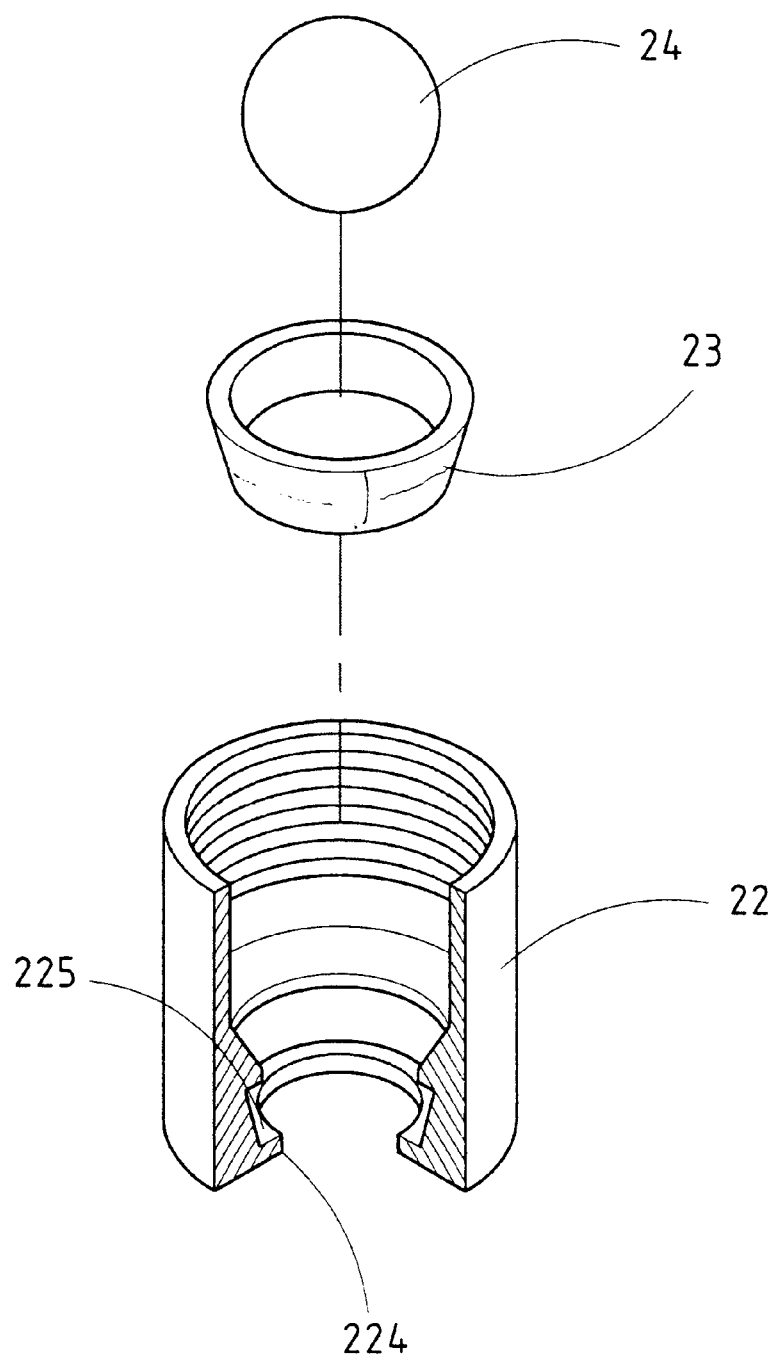
FIG. 5 shows an enlarged exploded view of the preferred embodiment of the present invention.

As shown in FIGS. 4–7, a water shut-off structure of the present invention is attained to a water container 20 of a pet drinking device. The shut-off structure of the present invention comprises a water outlet 21, a spout tube 22, a washer 23, and a steel ball 24.

The water outlet 21 is fastened at the inner end with the water container, and at the outer end with the inner end of the spout tube 22. The spout tube 22 has a discharge port 224 opposite to the inner end of the spout tube 22. The spout tube 22 is provided in the inner wall in proximity of the discharge port 224 with a stop ring 225. The washer 23 is of a conical construction and is received in the spout tube 22 such that the washer 23 is securely located between the stop ring 225 of the inner wall of the spout tube 22 and the outer end of the water outlet 21. In other words, the conical washer 23 is confined by the stop ring 225 of the spout tube 22 and the outer end of the water outlet 21. The steel ball 24 is movably received in the washer 23.

Figure 6:
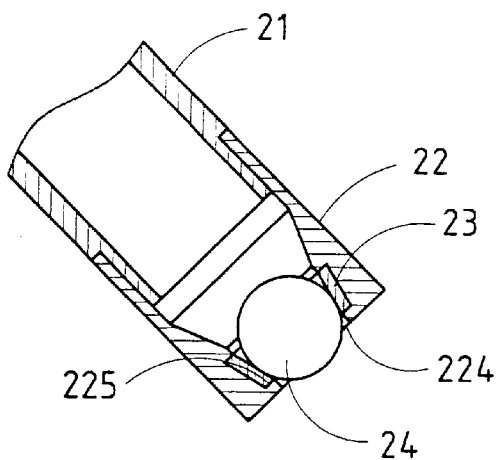
FIG. 6 shows a sectional schematic view of the preferred embodiment of the present invention.
Figure 7:
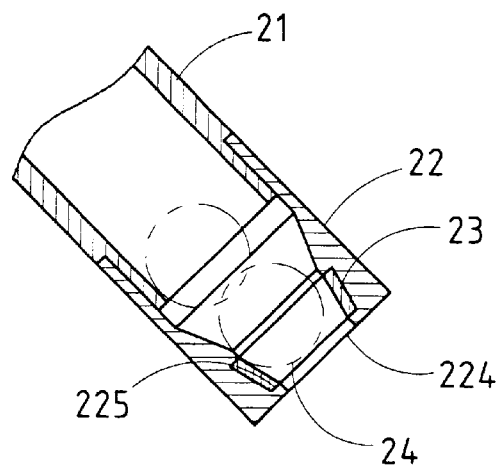
FIG. 7 shows a sectional schematic view of the preferred embodiment of the present invention at work.

As illustrated in FIG. 6, the steel ball 24 is partially jutted out of the spout tube 22 via the discharge port 224 of the spout tube 22. In the meantime, the steel ball 24 is in an intimate contact with the inner wall of the washer 23 so as to prevent the passage of water. When the steel ball 24 is licked by the tongue of a pet, the steel ball 24 is moved upward to allow the massage of water, as illustrated in FIG. 7. As soon as the act of licking is interrupted, the steel ball 24 falls back into place to make an intimate contact with the inner wall of the conical washer 23, as shown in FIG. 6. As a result, the water flow is shut off.

The washer 23 is securely located between the outer end of the water outlet 21 and the stop ring 225 of the spout tube 22. As a result, the washer 23 is prevented from being displaced at the time when the steel ball 24 is being licked by the pet. In light of the conical construction of the washer 23, the steel ball 24 is not hindered in its movement inside the conical washer 23. The conical washer 23 and the steel ball 24 of the present invention are therefore capable of effecting an immediate water stoppage upon withdrawal of the tongue of a pet.

I claim:

1. A water shut-off structure of a drinking device for a pet comprising:

a water outlet fastened at an inner end to a water container of the drinking device for the pet;

a spout tube fastened at an inner end to an outer end of said water outlet and provided at an outer end thereof with a discharge port;

a washer disposed in the interior of said spout tube; and a steel ball movably received in said washer such that said steel ball partially juts out of said spout tube via said discharge port of said spout tube;

wherein said spout tube is comprised, in an inner wall of the outer end thereof, of a stop ring;

wherein said washer is of a conical construction and is disposed in said spout tube such that said washer is confined by the outer end of said water outlet and said stop ring of the inner wall of said spout tube.

* * * * *